United States Patent [19]

Thies

[11] Patent Number: 5,584,577
[45] Date of Patent: Dec. 17, 1996

[54] SEAL FOR A FOOD BLENDER

[75] Inventor: Edward L. Thies, Tipp City, Ohio

[73] Assignee: Whirlpool Corporation, Benton Harbor, Mich.

[21] Appl. No.: 36,968

[22] Filed: Mar. 25, 1993

[51] Int. Cl.$^6$ .............................. B01F 7/16; B02C 18/12
[52] U.S. Cl. ...................... 366/205; 366/314; 241/282.2; 277/95; 384/140
[58] Field of Search .................................... 366/130, 197, 366/199, 205, 314; 99/348; 241/199.12, 282.1, 282.2; 384/139, 140; 277/95, 96, 96.2, 136, 137; 494/41

[56] References Cited

U.S. PATENT DOCUMENTS

| | | | |
|---|---|---|---|
| 2,533,399 | 12/1950 | Sadler et al. | 277/95 X |
| 2,755,900 | 7/1956 | Seyfried | 366/205 X |
| 2,804,289 | 8/1957 | Schwaneke . | |
| 2,913,230 | 11/1959 | Hutchins | 366/205 X |
| 2,940,738 | 6/1960 | Posener et al. | 366/205 |
| 3,064,949 | 11/1962 | Dewenter | 241/282.2 |
| 3,108,816 | 10/1963 | Moore | 277/96 X |
| 3,128,679 | 4/1964 | Trendle | 277/95 X |
| 3,139,917 | 7/1964 | Elmore | 366/205 X |
| 3,220,450 | 11/1965 | Aronson, II et al. . | |
| 3,292,937 | 12/1966 | Nunley | 494/41 X |
| 3,343,816 | 9/1967 | Reed | 366/314 |
| 3,359,871 | 12/1967 | Kamman | 277/96 X |
| 3,367,544 | 2/1968 | Formando | 277/96 X |
| 3,393,916 | 7/1968 | Askew | 277/96 X |
| 3,409,213 | 11/1968 | Latham, Jr. | 494/41 |
| 3,495,842 | 2/1970 | Nolte et al. | 277/96 X |
| 3,540,234 | 11/1970 | Raymond | 366/205 X |
| 3,784,118 | 1/1974 | Hurwitz | 241/282.1 |
| 3,854,733 | 12/1974 | Wilson | 277/95 X |
| 4,149,271 | 4/1979 | Uibel . | |
| 4,215,869 | 8/1980 | Pendleton | 277/95 X |
| 4,462,694 | 7/1984 | Ernster et al. . | |

FOREIGN PATENT DOCUMENTS

| | | | |
|---|---|---|---|
| 49789 | 1/1935 | Denmark | 384/139 |
| 989849 | 9/1951 | France | 241/199.12 |
| 1051085 | 1/1954 | France | 241/199.12 |
| 277605 | 9/1951 | Switzerland | 366/205 |
| 284330 | 7/1952 | Switzerland | 241/199.12 |
| 1378240 | 12/1974 | United Kingdom | 366/205 |

Primary Examiner—Charles E. Cooley
Attorney, Agent, or Firm—Hill, Steadman & Simpson

[57] ABSTRACT

A domestic blender having a blade carried on a shaft, with the shaft being supported for rotation within a sleeve shape bearing is provided with a seal to prevent passage of liquid into an area between the blade shaft and the bearing. The seal is an annular member having a central opening sized to snugly fit around the blade shaft and with a perpendicularly extending flange having an inner diameter size to snugly fit around an outer circumferential surface of the bearing. Preferably the seal rotates with the shaft and slides along the bearing which may be accomplished by providing the shaft with a non-circular cross section and the seal with a complementarily shaped opening. Preferably the seal is formed of a lubricated plastic material to reduce friction and wear.

8 Claims, 2 Drawing Sheets

SEAL FOR A FOOD BLENDER

BACKGROUND OF THE INVENTION

The present invention relates to a shaft seal and more particularly to a shaft seal for use in a kitchen blender.

Kitchen type blenders generally have a fixed base containing a motor with a drive shaft extending vertically therefrom. A jar is secured on to the fixed base for holding solid and/or liquid food items to be blended, liquified or chopped, etc. A blade assembly is mounted within the bottom portion of the jar for driving engagement with the motor shaft. Some type of shaft seal is generally provided in association with the drive shaft to prevent leakage of liquid from the blender along the shaft into the motor, however this shaft seal is subject to considerable wear due to the high rotating speeds of the blade drive shaft. Oftentimes this seal quickly wears out causing damage to the integral components of the blender and requiring frequent servicing by the blender owner.

SUMMARY OF THE INVENTION

The present invention provides an improved seal which is useful in the area between the drive shaft in a blender and a surrounding bearing. In a preferred arrangement, wherein the drive shaft is supported for rotation within a sleeve shaped bearing, the seal comprises an annular member having a central opening sized to snugly fit around the blade drive shaft and a perpendicularly extending flange having an inner diameter sized to snugly fit around an outer circumferential surface of the bearing. Preferably the seal rotates with the drive shaft, which can be accomplished by forming at least a portion of the drive shaft with a non-circular cross section and providing the seal with a complementarily shaped opening. The annular flange on the seal will snugly bear against the bearing to provide the sealing properties. In order to reduce the friction associated with the sliding of a seal against the bearing and the accompanying wear, preferably the seal is formed of a lubricated plastic material.

DETAILED DESCRIPTION OF THE PREFERRED EMBODIMENTS

The present invention relates to a seal to be used between a rotating shaft and its surrounding bearing. Although the invention is not limited to use in a domestic blender, it does find utility in such an environment and therefore an embodiment of the invention is disclosed in that environment.

Figure 1:
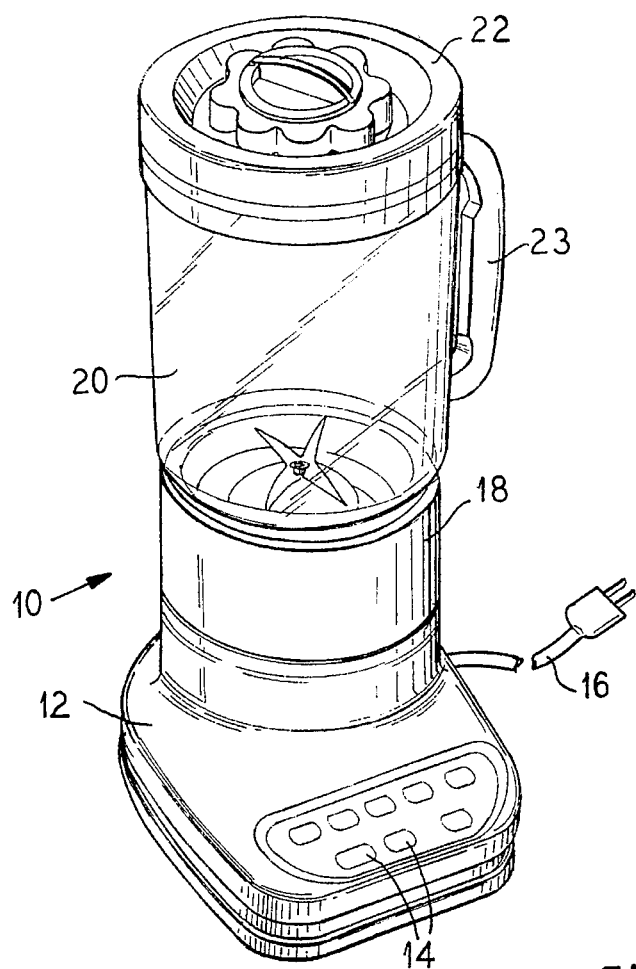
FIG. 1 is a perspective view of a domestic blender embodying the principles of the present invention.
Figure 4:
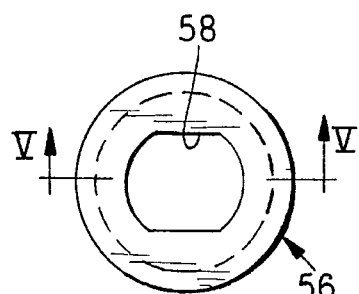
FIG. 4 is a plan view of the seal member embodying the principles of the present invention.

FIG. 1 illustrates a domestic kitchen blender generally at 10 which is comprised of a base member 12 having a plurality of electrical controls 14 and an electric cord 16 for connecting to a source of electrical power. The base 12 has an upstanding portion 18 to which is attached a jar 20. The jar 20 is provided with a lid 22 to close a top end of the jar. The jar 20 also has a radially projecting handle 23.

Figure 2:
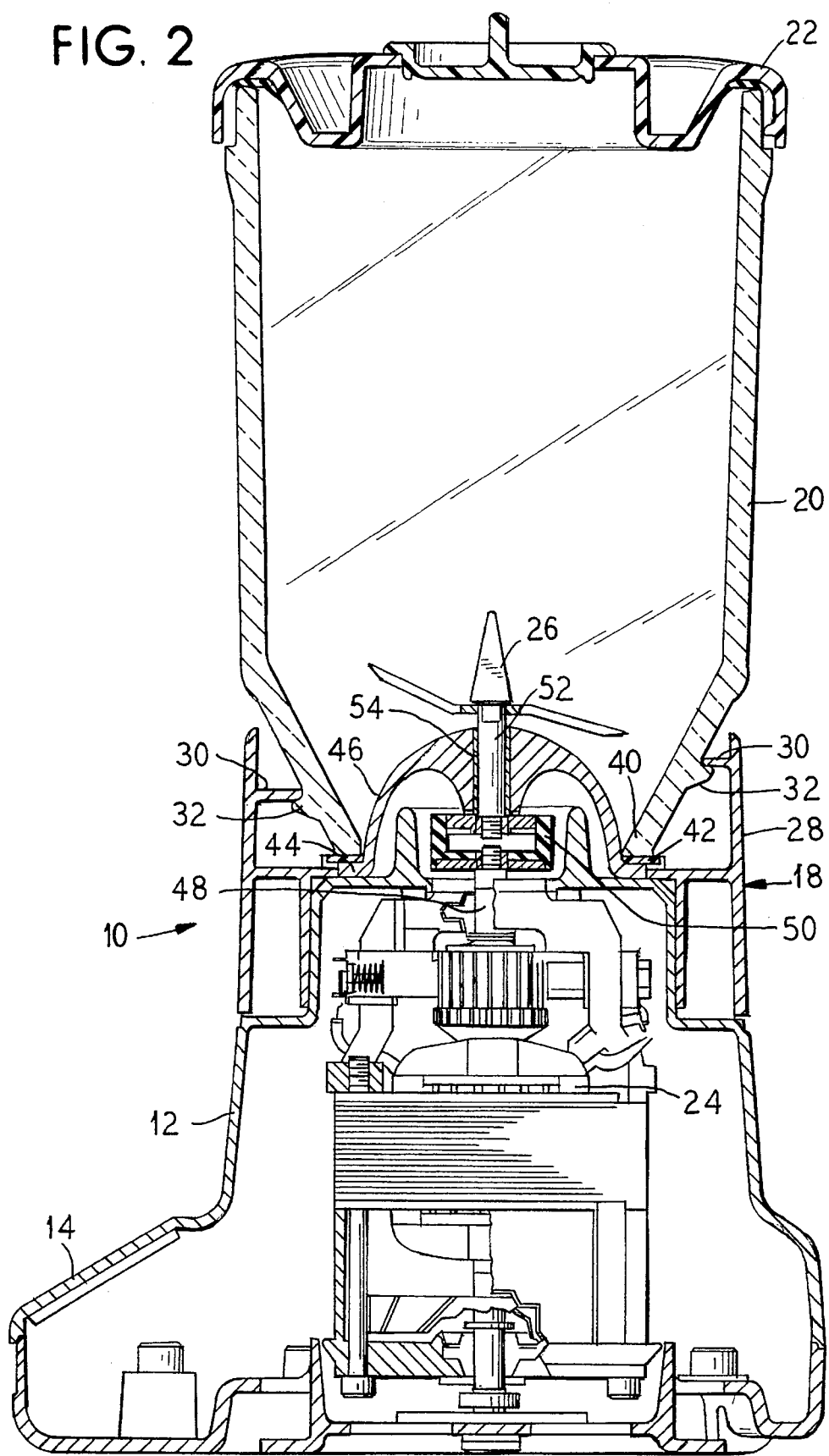
FIG. 2 is a side sectional view of the blender of FIG. 1.

The internal components of the blender are shown in greater detail in FIG. 2 where it is seen that the base 12 encloses an electric motor 24 which is used to rotatingly drive a blade 26 positioned within the blender jar. The upstanding portion 18 of the base 12 is a collar member which is separate from the base 12 and is slidingly received on the base. The base collar 18 has an essentially cylindrical outer wall 28 which is provided with an internal thread 30 to engage with an external thread 32 on the jar 20. When the jar 20 is introduced into the base collar 18 and rotated with respect thereto, the threads 30, 32 will engage and cause a bottom end 40 of the jar to sealingly engage against a seal 42. The seal 42 is supported by a circumferential flange 44 which is part of a floor 46 for the blender. In the embodiment illustrated in FIG. 2, the floor 46 is formed in a convex shape thus giving the floor an arcuate profile.

Figure 3:
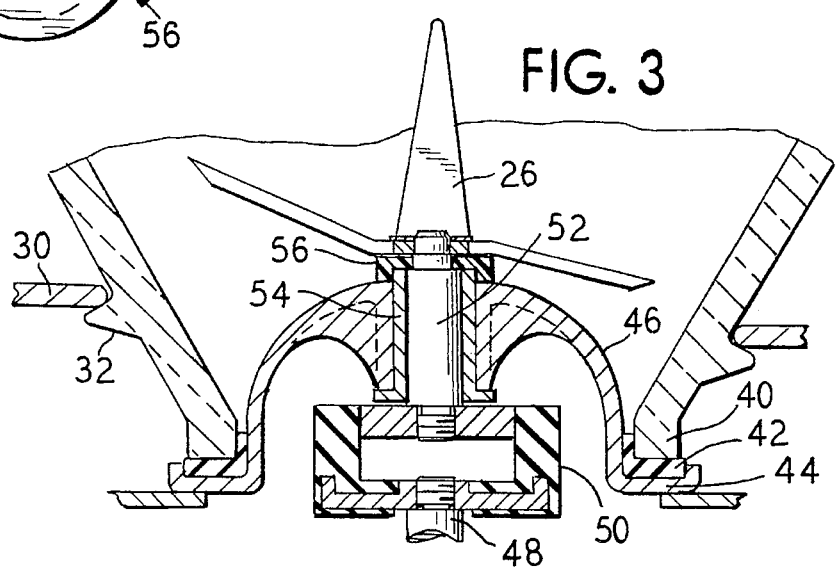
FIG. 3 is an enlarged partial sectional view of the drive shaft and bearing area.

The motor 24 includes a drive shaft 48 which, through a coupling 50 drives a drive shaft 52 carrying the blade 26. The drive shaft 52 extends vertically through the floor 46 of the blender and is carried in a cylindrical bearing 54. As best seen in FIG. 3, the bearing 54 protrudes slightly above the floor 46.

Figure 5:
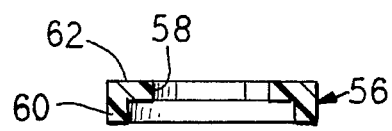
FIG. 5 is a sectional view of the seal taken generally along the line V—V of FIG. 4.

A seal 56 is provided which has a central opening 58 for receiving the drive shaft 52. The seal 56 has a L-shaped cross section (FIG. 5) with a flange 60 extending perpendicular to a top surface 62 of the seal. The short end surface of the L-shape represents the inner circumference of the opening 58 which should be sized to bear against the blade drive shaft 52. The flange 60, which is annular in shape, is sized to snugly fit around an outer circumferential surface of the bearing 54 and to extend downwardly to just short of the floor 46 of the blender.

In a preferred arrangement, the seal 56 will rotate with the drive shaft 52 and slide along the surface of the bearing 54. One way to assure this result is to form the blade drive shaft 52 with a non-circular cross section, at least in the area where the seal is seated, and to provide the opening 58 with a complementary shape. In order to reduce friction of the sliding of the flange 60 on the bearing 54, preferably the seal is formed of a lubricated plastic material such as Teflon or Parflon plastic material. Thus, the seal provides protection against liquids from entering the area between the blade drive shaft 52 and the bearing 54, and it also accommodates high speed rotation between those two parts without significant friction or wear.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A domestic blender having a blade carried on a shaft, said shaft being supported for rotation within a sleeve shaped bearing and said shaft having a single piece seal to prevent the passage of liquid into an area between said blade shaft and said bearing, said blade shaft having a non-circular cross section, said seal comprising an annular member having a central opening sized to snugly fit around and shaped complementarily to said non-circular cross section of said blade shaft, a flat face surrounding said opening and a flange positioned radially outwardly of and extending perpendicularly to said flat face having an inner diameter sized to snugly fit around an outer circumferential surface of said bearing, wherein said seal is formed of a lubricated plastic material.

2. A blender according to claim 1, wherein said seal rotates with said shaft and slides along said surface of said bearing.

3. A single piece seal member and a shaft supported for rotation within a sleeve shaped bearing, said shaft having a non-circular cross section, said seal member comprising an annular member having a central opening sized to snugly fit around and shaped complementarily to said non-circular cross section of said shaft, a flat face surrounding said opening and a flange extending perpendicularly to said flat face having an inner diameter sized to snugly fit around an outer circumferential surface of said bearing, wherein said seal is formed of a lubricated plastic material.

4. A seal according to claim 3, wherein said seal rotates with said shaft and slides along said surface of said bearing.

5. A single piece seal and a shaft supported for rotation within a sleeve, said shaft having a non-circular cross section, said seal member comprising an annular member having an L shaped cross section with a short end surface of said L shape bearing against said shaft and a parallel commonly facing surface bearing against an outer circumferential surface of said sleeve, said seal short end surface is shaped complementarily to said non-circular cross section wherein said seal is formed of a lubricated plastic material.

6. A seal according to claim 5, wherein said seal rotates with said shaft and slides along said surface of said sleeve.

7. A domestic blender comprising:
   a motor carried in a housing with a drive shaft for rotatingly driving a blade, said blade being carried on said drive shaft,
   said drive shaft being supported for rotation within a sleeve shaped bearing,
   said shaft having a non-circular cross section,
   said bearing being non-rotatingly carried in a wall of said housing to protrude above said wall, and
   a single piece seal to prevent the passage of liquid into an area between said driving shaft and said bearing,
   said seal comprising an annular member having a central opening sized to snugly fit around and shaped complementarily to said non-circular cross section of said drive shaft, and a flange extending parallel to said drive shaft having an inner diameter sized to snugly fit around an outer circumferential surface of said bearing,
wherein said seal is formed of a lubricated plastic material.

8. A seal according to claim 7, wherein said seal rotates with said shaft and slides along said surface of said sleeve.

* * * * *